(12) United States Patent
Abdel-Kader

(10) Patent No.: US 8,406,169 B2
(45) Date of Patent: *Mar. 26, 2013

(54) SCANNING GROUPS OF PROFILES OF WIRELESS LOCAL AREA NETWORKS

(75) Inventor: Sherif Abdel-Kader, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 913 days.

This patent is subject to a terminal disclaimer.

(21) Appl. No.: 12/471,954

(22) Filed: May 26, 2009

(65) Prior Publication Data

US 2009/0232040 A1     Sep. 17, 2009

Related U.S. Application Data

(63) Continuation of application No. 11/147,291, filed on Jun. 8, 2005, now Pat. No. 7,561,545.

(51) Int. Cl.
*H04W 4/00* (2009.01)
(52) U.S. Cl. ...... 370/328; 370/254; 370/311; 455/456.1
(58) Field of Classification Search ............... 455/456.1; 370/254, 311, 328, 338
See application file for complete search history.

(56) References Cited

U.S. PATENT DOCUMENTS

| | | | |
|---|---|---|---|
| 6,393,006 B1 | 5/2002 | Kajihara | |
| 6,850,774 B1 | 2/2005 | Cashman | |
| 7,468,966 B2 * | 12/2008 | Baker et al. | 370/332 |
| 7,561,545 B2 | 7/2009 | Abdel-Kader | |
| 2003/0118015 A1 | 6/2003 | Gunnarsson et al. | |
| 2004/0120278 A1 | 6/2004 | Krantz et al. | |
| 2004/0165563 A1 * | 8/2004 | Hsu et al. | 370/338 |
| 2005/0122921 A1 | 6/2005 | Seo | |
| 2005/0245269 A1 | 11/2005 | Demirhan et al. | |
| 2005/0281234 A1 | 12/2005 | Kawamura et al. | |
| 2006/0133330 A1 | 6/2006 | Chin | |
| 2006/0142004 A1 | 6/2006 | He et al. | |
| 2006/0148487 A1 | 7/2006 | Kim et al. | |
| 2006/0280128 A1 | 12/2006 | Abdel-Kader | |
| 2007/0277047 A1 * | 11/2007 | Mehta et al. | 713/300 |
| 2008/0198820 A1 | 8/2008 | Abdel-Kader | |

FOREIGN PATENT DOCUMENTS

| | | |
|---|---|---|
| EP | 1526682 | 4/2005 |
| GB | 2420937 | 6/2006 |
| WO | WO-9965270 | 12/1999 |
| WO | WO-2004031488 | 4/2004 |
| WO | WO-2004045225 | 5/2004 |
| WO | WO-2007082368 | 7/2007 |

OTHER PUBLICATIONS

Cho, Un C., First Office Action for U.S. Appl. No. 11/625,419, Dec. 2, 2009.
Cho, Un C., Second Office Action for U.S. Appl. No. 11/625,419, Jul. 12, 2010.
Lombardi, Giuseppe, "EESR", Extended European Search Report for EP 07100949.2, Jul. 17, 2007.

(Continued)

*Primary Examiner* — Tuan H Nguyen
(74) *Attorney, Agent, or Firm* — Integral Intellectual Property Inc.; Miriam Paton

(57) ABSTRACT

Two or more connection profiles stored in a wireless device are partitioned into two or more groups, each group having a different number of sleep intervals associated therewith. The number of sleep intervals associated with a particular group determines a wait between subsequent scans for wireless local area networks matching any profile in that particular group. One or more factors may be taken into consideration when determining how to partition the profiles into groups, including, for example, a connectivity history of the wireless device.

15 Claims, 4 Drawing Sheets

OTHER PUBLICATIONS

Matar, G., First Office Action for CA 2546330, Sep. 24, 2008.
Nguyen, Tuan H., Second Advisory Action for U.S. Appl. No. 11/147,291, Feb. 19, 2009.
Nguyen, Tuan H., Final Office Action for U.S. Appl. No. 11/147,291 Dec. 16, 2008.
Nguyen, Tuan H., Second Office Action for U.S. Appl. No. 11/147,291, May 16, 2008.
Nguyen, Tuan H., First Advisory Action for U.S. Appl. No. 11/147,291, Feb. 8, 2008.
Nguyen, Tuan H., Final office Action for U.S. Appl. No. 11/147,291, Oct. 23, 2007.
Nguyen, Tuan H., First Office Action for U.S. Appl. No. 11/147,291, May 7, 2007.
Rosenauer, H, "EESR", Extended European Search Report for 05104968.2, Nov. 11, 2005.
Cho, Un C., Notice of Allowance for U.S. Appl. No. 11/625,419, Oct. 6, 2010.

\* cited by examiner

SCANNING GROUPS OF PROFILES OF WIRELESS LOCAL AREA NETWORKS

CROSS-REFERENCE TO RELATED APPLICATIONS

This application is a continuation of U.S. patent application Ser. No. 11/147,291 filed Jun. 8, 2005, entitled "Scanning Groups of Profiles of Wireless Local Area Networks", which is incorporated by reference in its entirety.

BACKGROUND

Embodiments generally relate to wireless local area networks (WLAN), and in particular, to power saving for one or more client devices in a wireless network.

Some wireless networks are based on a cellular architecture where the system is subdivided into wireless network cells. One type of wireless network cell, known as a basic service set (BSS), contains client devices controlled by a wireless network access point (AP), and another type of wireless network cell, known as an independent basic service set (IBSS), contains client devices which are not controlled by an access point. A service set identifier (SSID) is a label or name that distinguishes one wireless network from another. Client devices use the SSID to establish and maintain connectivity. Wireless access points of different BSSs may be connected via a distribution system (DS) that is usually a wired network. The entire interconnected WLAN network, including the different WLAN cells, their respective WLAN access points and the distribution system is known as an extended service set (ESS).

A client device may, or may not, be battery-powered. For example, a client device, such as a wireless-enabled laptop, a wireless-enabled cellphone, a wireless-enabled personal digital assistant (PDA), and the like, may sometimes be battery-powered, and at other times may receive power from an external source, such as a power outlet. Other client devices, such as a desktop computer, may receive power from an external source, such as a power outlet, and may not have the option to be battery-powered. It may be beneficial to enhance the battery lifetime of battery-powered client devices.

A client device having two or more connection profiles may scan for wireless local area networks matching the profiles in sequence, and if no successful connection is achieved then the client device may go into a sleep state for a sleep interval (e.g., a few seconds) before trying to scan the profiles again. While a device is not in coverage and is scanning for wireless local area networks, the average amount of charge drawn from its battery may be related to the ratio between the time spent in the sleep state and the time spent scanning. For a device with N profiles, an exemplary sequence for scanning/sleeping may be as follows:

$$P_1 P_2 \ldots P_N \text{Sleep}_1 P_1 P_2 \ldots P_N \text{Sleep}_2 P_1 P_2 \ldots P_N \text{Sleep}_3 P_1 P_2 \ldots P_N \text{Sleep}_4 P_1 P_2 \ldots P_N$$

where $\text{Sleep}_1, \text{Sleep}_2, \ldots$ are sleep intervals between profile scanning intervals, and the duration of sleep intervals may be increased (that is, $\text{Sleep}_1 < \text{Sleep}_2 < \text{Sleep}_3 < \ldots$) until it reaches an upper limit. The more user profiles the device is scanning for, the lower the ratio between the time spent in the sleep state and the time spent scanning. This may have an adverse effect on the battery life of the device. For example, an exemplary wireless client device that is not in coverage may have a battery life of five days if scanning for one profile, three days if scanning for two profiles, and one and a half days if scanning for three profiles.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
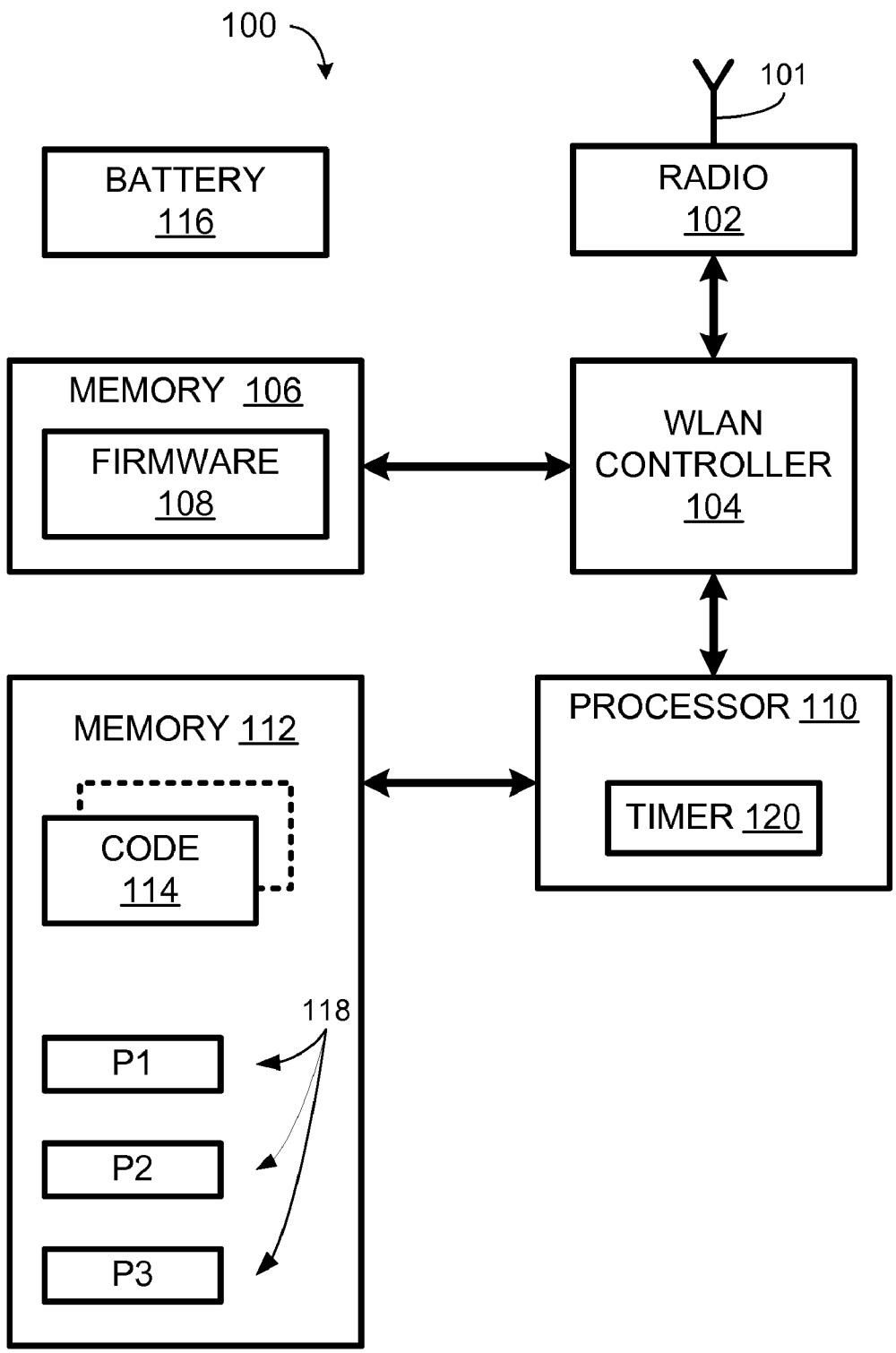
FIG. 1 is a block diagram of an exemplary wireless client device, according to some embodiments.

Reference is made to FIG. 1, which is a block diagram of an exemplary wireless client device 100, according to some embodiments. A non-exhaustive list of examples for client device 100 includes a wireless-enabled laptop, a wireless-enabled cellphone, a wireless-enabled personal digital assistant (PDA), a wireless-enabled video camera, a wireless-enabled gaming console, a wireless Internet-Protocol (IP) phone and any other suitable wireless client device.

Wireless client device 100 includes at least one antenna 101 coupled to a radio 102, which in turn is coupled to a WLAN controller 104. WLAN controller 104 may be coupled to a memory 106 storing firmware 108 to be executed by WLAN controller 104. Wireless client device 100 includes a processor 110 and a memory 112 coupled to processor 110. Memory 112 may store executable code 114 to be executed by processor 110.

Processor 110 may be coupled to WLAN controller 104 and may be able to control, at least in part, the operation of WLAN controller 104. Client device 100 includes a battery 116 to provide power to radio 102, WLAN controller 104, processor 110 and memories 106 and 112. Wireless client device 100 may include other components that, for clarity, are not shown.

A non-exhaustive list of examples for processor 110 includes a central processing unit (CPU), a digital signal processor (DSP), a reduced instruction set computer (RISC), a complex instruction set computer (CISC) and the like. Memories 106 and 112 may be fixed in or removable from client device 100. A non-exhaustive list of examples for memories 106 and 112 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antenna 101 includes a dipole antenna, a monopole antenna, a multilayer ceramic antenna, a planar inverted-F antenna, a loop antenna, a slot antenna, a dual antenna, an omnidirectional antenna and any other suitable antenna.

Radio 102, WLAN controller 104, processor 110 and memories 106 and 112 are functional blocks and may be implemented in any physical way in client device 100. For example, radio 102, WLAN controller 104, processor 110 and memories 106 and 112 may be implemented in separate integrated circuits, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

In the example of FIG. 1, client device 100 is "IEEE 802.11-enabled", which means that wireless communications via WLAN controller 104 are in accordance with one or more of the following standards defined by the Institute of Electrical and Electronic Engineers (IEEE) for Wireless LAN MAC and Physical layer (PHY) specifications. However, it will be obvious to those of ordinary skill in the art how to modify the following for other existing WLAN standards or future related standards, including IEEE 802.11n.

| Standard | Published | Maximum Speed | Frequency | Modulation |
|---|---|---|---|---|
| IEEE 802.11 | 1997 | 2 Mbps | 2.4 GHz | Phase-Shift |
| IEEE 802.11a | 1999 | 54 Mbps | 5.0 GHz | Orthogonal Frequency Division Multiplexing |
| IEEE 802.11b | 1999 | 11 Mbps | 2.4 GHz | Complementary Code Keying |
| IEEE 802.11g | 2003 | 54 Mbps | 2.4 GHz | Orthogonal Frequency Division Multiplexing |

The IEEE 802.11 standard explains that access points transmit beacon frames at substantially regular time periods to announce the existence of and to synchronize wireless networks. The format of beacon frames and their contents is explained in detail in the IEEE 802.11 standard. The beacon interval is included in each beacon frame. The number of time units between target beacon transmission times is referred to as a "beacon interval".

Beacon frames may, or may not include the SSID of the wireless network they belong to. In addition, each beacon frame also includes a timestamp which is the value of a clock internal to the access point at the actual transmission time of the beacon. A client device receiving the beacon frame will update its internal clock according to the timestamp in the received beacon frame. Moreover, beacon frames may include other information.

Figure 2:
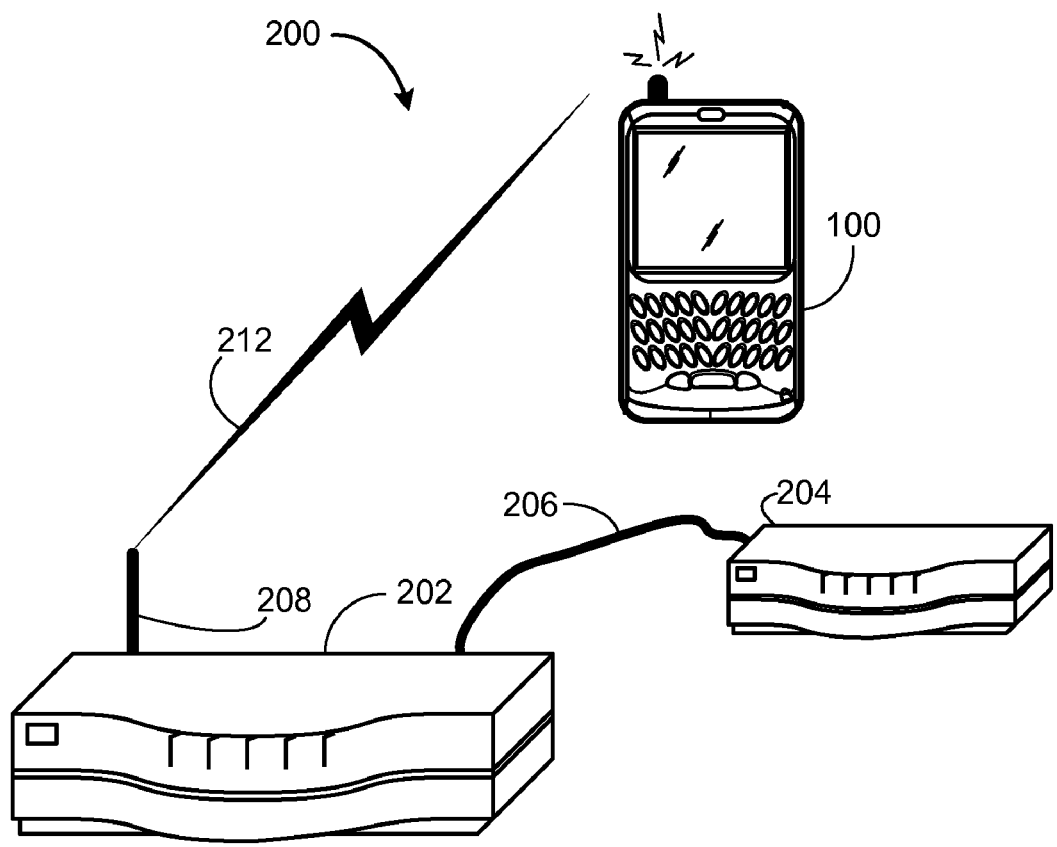
FIG. 2 is an illustration of an exemplary communications system, according to some embodiments.

Reference is made additionally to FIG. 2, which is an illustration of an exemplary communications system 200 according to embodiments. System 200 includes a wireless access point (AP) 202 and a network gateway 204 coupled to AP 202 via wired connections 206. Network gateway 204 and wired connections 206 may be part of a "distribution system" for AP 202. Non-limiting examples for network gateway 204 are cable modems, Asymmetric Digital Subscriber Line (ADSL) modems, Asynchronous Transfer Mode (ATM) network gateways, dial-up modems, satellite modems, Integrated Services Digital Network (ISDN) gateways, T-carrier 1 (T1) modems, and the like. It is obvious that any other configuration of a distribution system for AP 202 is possible.

AP 202 has at least one antenna 208 and is configurable to support at least one wireless network name, for example, at least one service set identifier (SSID). A non-exhaustive list of examples for antenna 208 includes a dipole antenna, a monopole antenna, a multilayer ceramic antenna, a planar inverted-F antenna, a loop antenna, a slot antenna, a dual antenna, an omnidirectional antenna and any other suitable antenna. AP 202 may include a router. In the example of FIG. 2, AP 202 is "IEEE 802.11-enabled", however, it will be obvious to those of ordinary skill in the art how to modify the following for other existing WLAN standards or future related standards, including IEEE 802.11n.

Code 114 may implement a scanning module, possibly along with additional functionality. When executed by processor 110, the scanning module may cause client device 100 to look for a wireless network to which it can connect using techniques known as "active scanning" and "passive scanning". Processor 110 may program a connection profile, including the SSID (which may be an empty string), to WLAN controller 104. Upon being operatively coupled to radio 102, WLAN controller 104 may automatically initiate passive scanning for a wireless network that matches the programmed connection profile.

In passive scanning, WLAN controller 104 listens for beacon frames, one communication channel at a time. Standard IEEE 802.11b, for example, defines 11 different communication channels. If a beacon frame including the SSID of the sought wireless network is received, WLAN controller 104 may initiate an authentication process and, if the authentication process is successful, may initiate an association process with the access point that sent the beacon frame. For example, the access point that sent the beacon frame may be AP 202, and if the association process is successful, client device 100 may become associated with AP 202 over a wireless network 212.

If a beacon frame not including any SSID is received, WLAN controller 104 may initiate a connectivity sequence by transmitting a probe request on the communication channel on which the beacon frame was received. If a "probe response" for the transmitted probe request is received, and if the profile included in the probe response matches the profile stored in WLAN controller 104, WLAN controller 104 may initiate an authentication process and, if the authentication process is successful, may initiate an association process with the access point that sent the probe response. For example, the access point that sent the probe response may be AP 202, and if the association process is successful, client device 100 may become associated with AP 202 over a wireless network 212.

If the profile in the probe response matches the SSID of the profile stored in WLAN controller 104, but does not match other characteristics of that profile, or if the profile in the probe response does not match the SSID of the profile stored in WLAN controller 104, then WLAN controller 104 may proceed to passively scan on the next communication channel. Client device 100 may wait a predefined period of time, for example, 3 seconds, for WLAN controller 104 to report having successfully associated with the sought wireless network. If no such report is received during this predefined period of time (timed using a timer 120 in processor 110), client device 100 may take additional action, such as, for example, programming into WLAN controller 104 an additional connection profile or putting radio 102 into a sleep state.

In active scanning, WLAN controller 104 does not wait for the receipt of a beacon frame in order to transmit the probe request. Moreover, WLAN controller 104 reports back to processor 110 as soon as WLAN controller 104 has succeeded in discovering an access point with the particular wireless network name in the probe requests of the active scanning. Similarly, WLAN controller 104 reports back to processor 110 as soon as WLAN controller 104 has failed to discover any access points with the particular wireless network name in the probe requests of the active scanning. Consequently, if no access point with the particular wireless network name has been discovered due to the active scanning, client device 100 will be notified of such sooner than if it had relied on passive scanning.

Client device 100 may have stored in memory 112 two or more connection profiles 118 of wireless local area networks. For example, a user of client device 100 may store in memory 112 a profile $P_1$ of the wireless local area network at the user's home, a profile $P_2$ of the wireless local area network at the user's workplace, and a profile $P_3$ of any wireless local area network (e.g. a hotspot, which is a WLAN node that provides Internet connection and virtual private network access from a given location).

Figure 3:
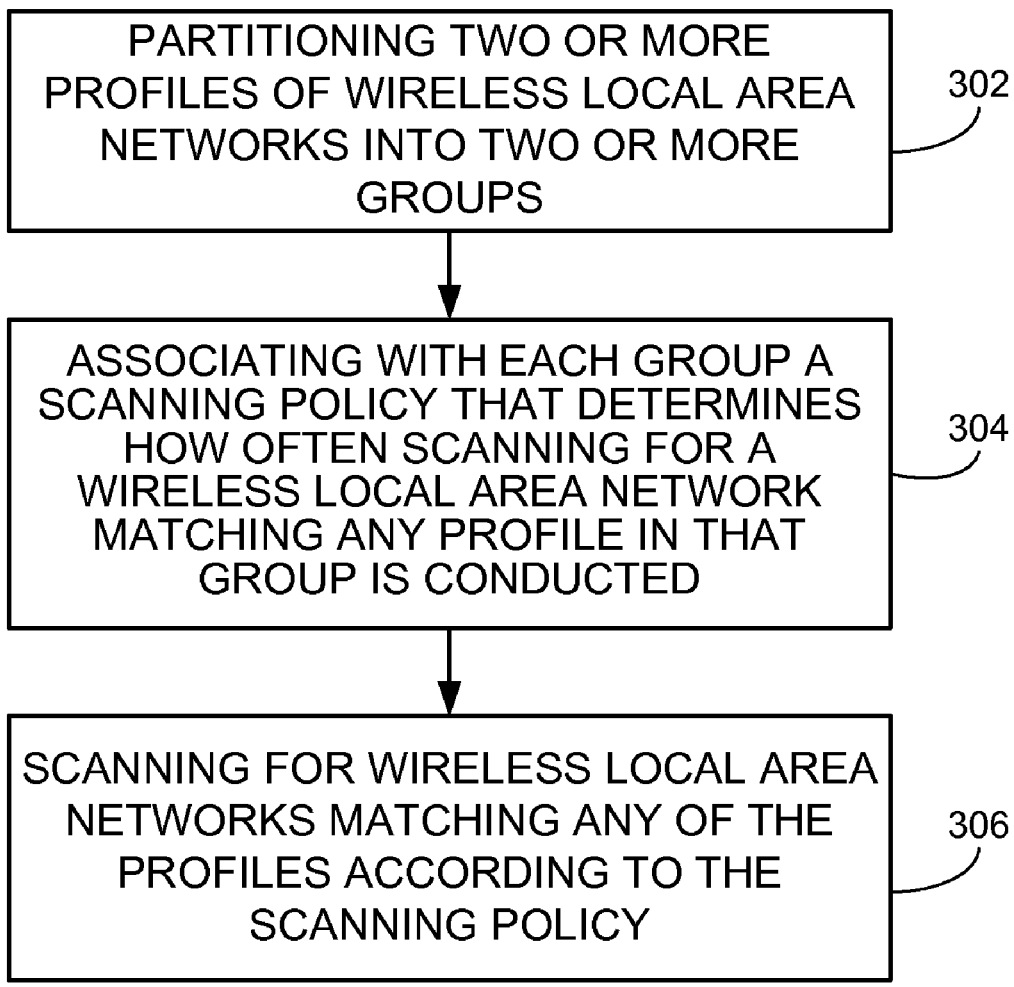
FIG. 3 is a flowchart of an exemplary method to be performed by a client device, according to some embodiments.

Reference is now made to FIG. 3, which is a flowchart of an exemplary method to be implemented in client device 100, according to some embodiments. Executable code 114, when executed by processor 110, may cause client device 100 to implement the method of FIG. 3.

At 302, client device 100 may partition connection profiles 118 into two or more groups. By "partition", it is meant that while each profile belongs to a group, none of the profiles belongs to more than one of the groups. A group may consist of one or more profiles. At 304, client device 100 may associate with each group a scanning policy that determines how often scanning for wireless local area networks that match any profile in the group is conducted. For the experience of a user of the client device to be tolerable, there is a limit to how infrequently scanning for wireless local area networks matching certain profiles is conducted. For example, it may be tolerable to the user that certain profiles are scanned only once every third sleep interval if a sleep interval is 60 seconds or less in duration.

Associating scanning policies with the groups may occur before, after or concurrently with partitioning the connection profiles into groups. Moreover, the connection profiles may be newly partitioned into groups each time client device 100 begins a new scanning sequence, for example, when client device 100 loses a connection to or goes out of range of any wireless local area networks matching any of the stored profiles One or more factors may be taken into consideration when determining how to partition the connection profiles into groups. A non-exhaustive list of examples for such factors includes a connectivity history of client device 100 and priorities assigned to the profiles. The connectivity history of client device may include, for example, any or a combination, possibly weighted, of one or more of the following:

i) how many times client device 100 was connected to wireless local area networks matching a particular profile;

ii) how recently client device 100 was connected to a wireless local area network matching a particular profile; and iii) the total duration of connections of client device 100 to wireless local area networks matching a particular profile.

The connectivity history of the wireless client device on which the partitioning of the profiles into groups is based may be cleared when appropriate, and/or may include a forgetting factor so that older connections have less effect than more recent connections.

Example 1: Profiles $P_1$ (work), $P_2$ (home) and $P_3$ (any) may be partitioned into a group of high-priority profiles consisting of profiles $P_1$ and $P_2$ and a group of low-priority profiles consisting of profile $P_3$. The group of high-priority profiles may have associated therewith a scanning policy of scanning once per each sleep interval, and the group of low-priority connection profiles may have associated therewith a scanning policy of scanning once per each other sleep interval.

| group description | profiles | scanning policy |
| --- | --- | --- |
| high-priority profiles | $P_1$ and $P_2$ | once per each sleep interval |
| low-priority profiles | $P_3$ | once per each other sleep interval |

Example 2: Client device 100 may monitor on a profile-by-profile basis how many times client device 100 connects to wireless local area networks matching profiles $P_1$ (work), $P_2$ (home) and $P_3$ (any). For example, client device 100 may have connected to WLANs matching profile $P_1$ 15 times, to WLANs matching profile $P_2$ 8 times, and to WLANs matching profile $P_3$ 3 times. Profiles $P_1$, $P_2$ and $P_3$ may therefore be partitioned into a group of most-frequently used profiles (consisting of profile $P_1$), a group of least-frequently used profiles (consisting of profile $P_3$), and a group of profiles that are neither most-frequently used nor least-frequently used (consisting of profile $P_2$). The group of one or more most-frequently connected profiles may have associated therewith a scanning policy for being scanned once per each sleep interval, the group of one or more least-frequently connected profiles may have associated therewith a scanning policy for being scanned once per each third sleep interval, and the group of any other profiles may have associated therewith a scanning policy for being scanned once per each second sleep interval.

| group description | profiles | scanning policy |
| --- | --- | --- |
| most-frequently used | $P_1$ | once per each sleep interval |
| neither most-frequently used nor least-frequently used | $P_2$ | once per each second sleep interval |
| least-frequently used | $P_3$ | once per each third sleep interval |

At 306, client device 100 may activate the scanning module to scan for wireless local area networks so that scanning for wireless local area networks matching any profile in a particular group is conducted according to the scanning policy of the particular group.

Figure 4:
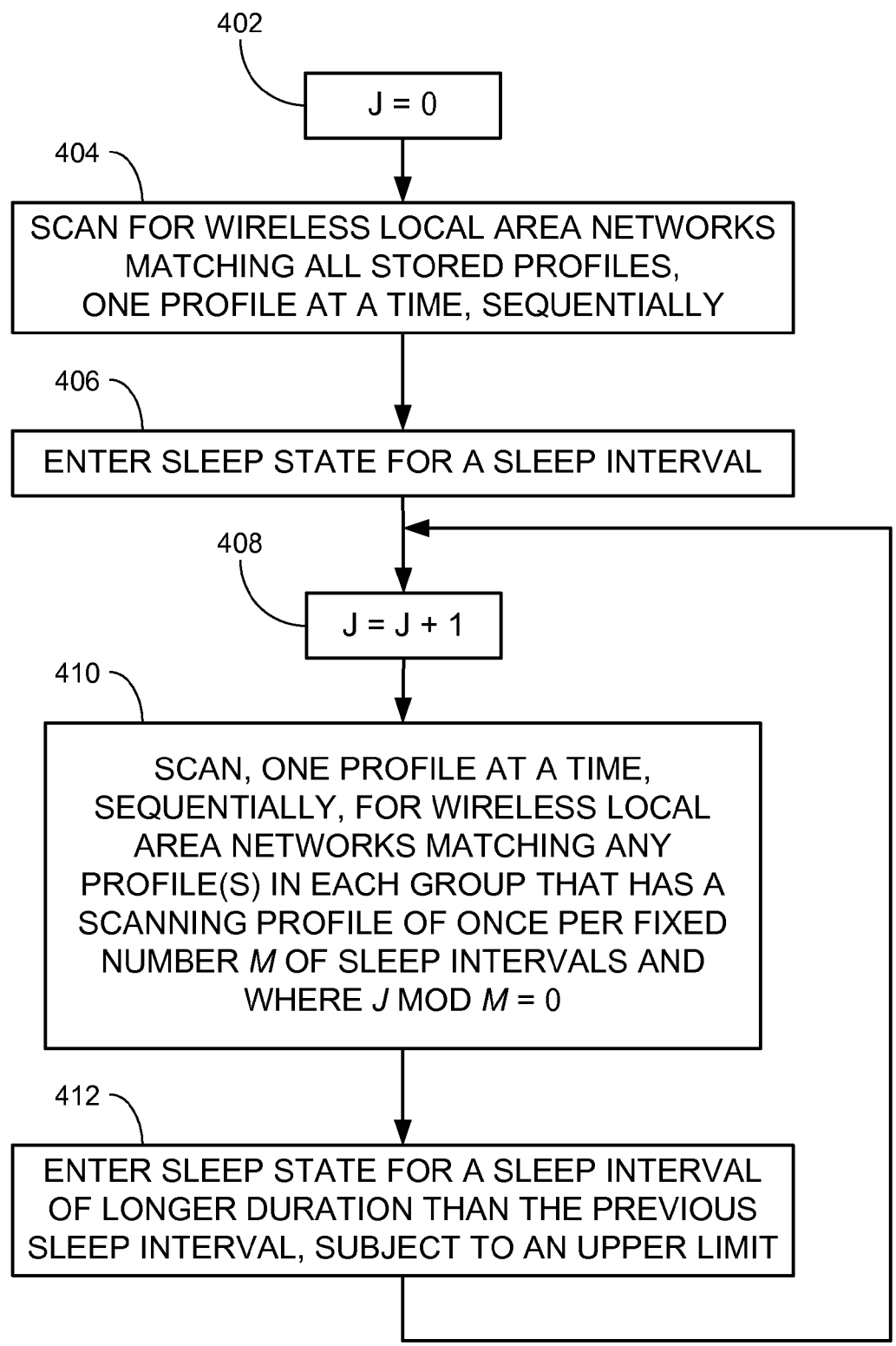
FIG. 4 is a flowchart of an exemplary method for scanning according to scanning policies of groups of profiles, according to some embodiments.

An example of scanning according to scanning policies of two or more groups of profiles is shown in FIG. 4, which is a flowchart of an exemplary method to be implemented by client device 100, according to some embodiments. Executable code 114, when executed by processor 110, may cause client device 100 to implement the method of FIG. 4.

At 402, a counter J is set to zero. At 404, client device 100 scans for wireless local area networks matching the stored profiles, one profile at a time, sequentially. As explained above, processor 110 programs a particular profile to WLAN controller 104, which scans, one communication channel at a time, for a wireless local area network matching the programmed profile. If a matching wireless local area network is found, then this method is exited during 404 so that client device 100 can attempt to associate with the access point that controls the matching wireless local area network. If no such wireless local area network is found, processor 110 programs another profile to WLAN controller 104, which scans, one communication channel at a time, for a wireless local area network matching the newly programmed profile. Once scanning has been conducted once for each of the stored profiles, at 406, radio 102 (and possibly other components of client device 100) enters a sleep state for a sleep interval $Sleep_1$.

At 408, counter J is incremented by one. At 410, client device 100 scans, one profile at a time, sequentially, for wireless local area networks matching any profile(s) in each group that has a scanning policy of once per a fixed number M of sleep intervals, where J mod M=0. If a matching wireless local area network is found, then this method is exited during 410 so that client device 100 can attempt to associate with the access point that controls the matching wireless local area network. Otherwise, at 412, radio 102 (and possibly other components of client device 100) enters a sleep state for a sleep interval of longer duration than the previous sleep interval, subject to an upper limit.

Example 1: The group of high-priority profiles ($P_1$ and $P_2$) has a scanning policy of once per each sleep interval, i.e. M=1, and the group of low-priority profiles ($P_3$) has a scanning policy of once per each other sleep interval, i.e. M=2. For all values of counter J, J mod1=0, and scanning for wireless local area networks matching high-priority profiles is conducted. When counter J has an odd value, then J mod2=1, and no scanning for wireless local area networks matching low-priority profiles is conducted. When counter J has an even value, then J mod2=0, and scanning for wireless local area networks matching low-priority profiles is conducted. Consequently, the sequence for scanning may be as follows:

$$P_1P_2P_3\ Sleep_1\ P_1P_2\ Sleep_2\ P_1P_2P_3\ Sleep_3\ P_1P_2\ Sleep_4\ P_1P_2P_3\ Sleep_5\ P_1P_2\ldots$$

where $Sleep_1, Sleep_2, \ldots$ are sleep intervals between profile scanning, and the duration of sleep intervals increases (that is, $Sleep_1 < Sleep_2 < Sleep_3 < \ldots$) until it reaches an upper limit. Since in this example low-priority profiles are scanned less often than high-priority profiles, this scanning sequence may result in longer battery lifetimes when long periods of scanning occur, such as when client device 100 is out of range of any wireless local area networks matching any of the stored profiles.

Example 2: The group of most-frequently used profiles has a scanning policy of once per each sleep interval, i.e. M=1, the group of least-frequently used profiles has a scanning policy of once per each third sleep interval, i.e. M=3, and the group of neither most-frequently used nor least-frequently used profiles has a scanning policy of once per each other sleep interval, i.e. M=2. Consequently the sequence for scanning may be as follows:

$$P_1P_2P_3\ Sleep_1\ P_1\ Sleep_2\ P_1P_2\ Sleep_3\ P_1P_3\ Sleep_4\ P_1P_2\ Sleep_5\ P_1\ Sleep_6\ P_1P_2P_3\ldots$$

where $Sleep_1, Sleep_2, \ldots$ are sleep intervals between profile scanning, and the duration of sleep intervals increases (that is, $Sleep_1 < Sleep_2 < Sleep_3 < \ldots$) until it reaches an upper limit. Since in this example scanning for the least-recently used profiles occurs less often than scanning for the most-recently used profiles, this scanning sequence may result in longer battery lifetimes when long periods of scanning occur, such as when client device 100 is out of range of any wireless local area networks matching any of the stored profiles.

While certain features have been illustrated and described herein, many modifications, substitutions, changes, and equivalents will now occur to those of ordinary skill in the art. It is, therefore, to be understood that the appended claims are intended to cover all such modifications and changes.

What is claimed is:

1. A method in a wireless device, the method comprising:
partitioning two or more profiles of wireless local area networks stored in the wireless device into two or more groups, each of the groups having associated therewith a different number of sleep intervals; and
waiting the number of sleep intervals associated with a particular group between subsequent scans for wireless local area networks matching any profile in the particular group.

2. The method of claim 1, wherein partitioning the profiles into the groups comprises:
partitioning the profiles into the groups based on priorities of the profiles.

3. The method of claim 1, wherein partitioning the profiles into the groups comprises:
partitioning the profiles into the groups based on a history of connectivity of the wireless device to wireless local area networks matching the profiles.

4. The method of claim 3, further comprising:
monitoring on a profile-by-profile basis how many times the wireless device was connected to wireless local area networks matching a particular profile.

5. The method of claim 3, further comprising:
monitoring on a profile-by-profile basis how recently the wireless device was connected to wireless local area networks matching a particular profile.

6. The method of claim 3, further comprising:
monitoring on a profile-by-profile basis a total duration of connections of the wireless device to wireless local area networks matching a particular profile.

7. A method in a wireless device, the method comprising:
partitioning two or more profiles of wireless local area networks into a first group and a second group;
scanning for wireless local area networks matching any profile in the first group once per each sleep interval; and
scanning for wireless local area networks matching any profile in the second group once per each second sleep interval.

8. A wireless device comprising:
an antenna;
a radio coupled to the antenna;
a wireless local area network controller coupled to the radio;
a processor coupled to the wireless local area network controller; and
memory to store two or more profiles of wireless local area networks and to store code which, when executed by the processor, partitions the two or more profiles into two or more groups, each of the groups having associated therewith a different number of sleep intervals, and waits the number of sleep intervals associated with a particular group between subsequent scans for wireless local area networks matching any profile in the particular group.

9. The wireless device of claim 8, wherein the code, when executed by the processor, partitions the two or more profiles into the two or more groups based on priorities of the profiles.

10. The wireless device of claim 8, wherein the code, when executed by the processor, partitions the two or more profiles into the two or more groups based on a connectivity history of the wireless device.

11. The wireless device of claim 10, wherein the connectivity history of the wireless device includes how many times the wireless device was connected to wireless local area networks matching a particular profile.

12. The wireless device of claim 10, wherein the connectivity history of the wireless device includes how recently the wireless device was connected to wireless local area networks matching a particular profile.

13. The wireless device of claim 10, wherein the connectivity history of the wireless device includes a total duration of connections of the wireless device to wireless local area networks matching a particular profile.

14. The wireless device of claim 8, wherein the wireless local area controller is compatible with IEEE 802.11.

15. A wireless device comprising:
an antenna;
a radio coupled to the antenna;
a wireless local area network controller coupled to the radio;
a processor coupled to the wireless local area network controller; and
memory to store two or more profiles of wireless local area networks and to store code which, when executed by the processor, partitions the two or more profiles into a first group and a second group, scans for wireless local area networks matching any profile in the first group once per each sleep interval and scans for wireless local area networks matching any profile in the second group once per each second sleep interval.

* * * * *